United States Patent
Hull et al.

(10) Patent No.: US 7,357,300 B2
(45) Date of Patent: Apr. 15, 2008

(54) METHOD AND APPARATUS FOR TRACKING DOCUMENTS IN A WORKFLOW

(75) Inventors: Jonathan J. Hull, San Carlos, CA (US); Jamey Graham, San Jose, CA (US); Dar-Shyang Lee, Union City, CA (US); Hideki Segawa, Foster City, CA (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/996,805

(22) Filed: Nov. 23, 2004

(65) Prior Publication Data

US 2005/0182757 A1    Aug. 18, 2005

Related U.S. Application Data

(63) Continuation of application No. 10/234,414, filed on Sep. 3, 2002, now Pat. No. 6,860,422.

(51) Int. Cl.
*G06F 7/00* (2006.01)
(52) U.S. Cl. .................. 235/376; 235/385; 235/451; 340/572.01
(58) Field of Classification Search .......... 235/375, 235/376, 385, 451; 340/572.01, 10.1
See application file for complete search history.

(56) References Cited

U.S. PATENT DOCUMENTS

| | | |
|---|---|---|
| 4,862,160 A | 8/1989 | Ekchian et al. |
| 5,287,414 A | 2/1994 | Foster |
| 5,666,490 A * | 9/1997 | Gillings et al. ............. 709/238 |
| 5,689,238 A | 11/1997 | Cannon, Jr. et al. |
| 5,706,452 A * | 1/1998 | Ivanov ....................... 715/751 |
| 5,732,401 A | 3/1998 | Conway |
| 5,926,116 A | 7/1999 | Kitano et al. |
| 5,933,829 A | 8/1999 | Durst et al. |
| 5,936,527 A | 8/1999 | Isaacman et al. |
| 5,939,981 A | 8/1999 | Renney |
| 5,974,202 A | 10/1999 | Wang et al. |
| 5,978,477 A | 11/1999 | Hull et al. |
| 5,978,773 A | 11/1999 | Hudetz et al. |
| 6,008,727 A | 12/1999 | Want et al. |

(Continued)

FOREIGN PATENT DOCUMENTS

EP    794 507 B1    4/2004

(Continued)

OTHER PUBLICATIONS

WC3®, "URIs, URLs, and URNs: Clarifications and Recommendations 1.0, Report form the joint W3C/IETF URI Planning Interest Group," downloaded from http://www.w3.org/TR/uri-clarification/ on Jun. 9, 2005.

(Continued)

*Primary Examiner*—Steven S. Paik
(74) *Attorney, Agent, or Firm*—Townsend and Townsend and Crew, LLP

(57) ABSTRACT

A workflow system and method include tracking the physical movement of documents. The information of the physical movement is incorporated with the flow graph of a workflow. A display of the workflow can then be enhanced by the information relating to the physical movement of the document.

13 Claims, 5 Drawing Sheets

U.S. PATENT DOCUMENTS

| | | | |
|---|---|---|---|
| 6,055,544 A | 4/2000 | DeRose et al. | |
| 6,100,804 A | 8/2000 | Brady et al. | |
| 6,104,834 A | 8/2000 | Hull | |
| 6,108,656 A | 8/2000 | Durst et al. | |
| 6,122,520 A | 9/2000 | Want et al. | |
| 6,127,928 A | 10/2000 | Issacman et al. | |
| 6,130,621 A | 10/2000 | Weiss | |
| 6,176,425 B1 | 1/2001 | Harrison et al. | |
| 6,195,006 B1 | 2/2001 | Bowers | |
| 6,199,048 B1 | 3/2001 | Hudetz et al. | |
| 6,204,764 B1 | 3/2001 | Maloney | |
| 6,232,870 B1 | 5/2001 | Garber et al. | |
| 6,249,226 B1 | 6/2001 | Harrison et al. | |
| 6,259,367 B1 | 7/2001 | Klein | |
| 6,260,049 B1 | 7/2001 | Fitzgerald et al. | |
| 6,262,662 B1 | 7/2001 | Back et al. | |
| 6,278,413 B1 | 8/2001 | Hugh et al. | |
| 6,294,998 B1 | 9/2001 | Adams et al. | |
| 6,297,737 B1 | 10/2001 | Irvin | |
| 6,304,182 B1 | 10/2001 | Mori et al. | |
| 6,307,473 B1 | 10/2001 | Zampini et al. | |
| 6,324,353 B1* | 11/2001 | Laussermair et al. | 399/16 |
| 6,326,889 B1 | 12/2001 | Van Horn et al. | |
| 6,333,690 B1 | 12/2001 | Nelson et al. | |
| 6,335,685 B1 | 1/2002 | Schrott et al. | |
| 6,337,619 B1 | 1/2002 | Kowalski et al. | |
| 6,340,931 B1 | 1/2002 | Harrison et al. | |
| 6,341,931 B1 | 1/2002 | Bates | |
| 6,354,493 B1 | 3/2002 | Mon | |
| 6,359,628 B1* | 3/2002 | Buytaert | 345/619 |
| 6,380,894 B1 | 4/2002 | Boyd et al. | |
| 6,427,032 B1 | 7/2002 | Irons et al. | |
| 6,430,554 B1 | 8/2002 | Rothschild | |
| 6,434,561 B1 | 8/2002 | Durst, Jr. et al. | |
| 6,442,563 B1* | 8/2002 | Bacon et al. | 707/103 R |
| 6,512,919 B2 | 1/2003 | Ogasawara | |
| 6,542,933 B1 | 4/2003 | Durst, Jr. et al. | |
| 6,651,053 B1 | 11/2003 | Rothschild | |
| 6,651,063 B1 | 11/2003 | Vorobiev | |
| 6,655,586 B1 | 12/2003 | Back et al. | |
| 6,675,165 B1 | 1/2004 | Rothschild | |
| 6,707,381 B1 | 3/2004 | Maloney | |
| 6,766,363 B1 | 7/2004 | Rothschild | |
| 6,801,907 B1 | 10/2004 | Zagami | |
| 6,825,753 B2 | 11/2004 | Cardinale et al. | |
| 6,860,422 B2 | 3/2005 | Hull et al. | |
| 6,865,608 B2 | 3/2005 | Hunter | |
| 6,892,376 B2* | 5/2005 | McDonald et al. | 717/103 |
| 6,993,573 B2 | 1/2006 | Hunter | |
| 7,006,664 B2 | 2/2006 | Paraskevakos | |
| 2002/0032698 A1 | 3/2002 | Cox | |
| 2002/0032707 A1 | 3/2002 | Takeoka | |
| 2002/0113707 A1 | 8/2002 | Grunes et al. | |
| 2002/0176116 A1* | 11/2002 | Rhoads et al. | 358/405 |
| 2003/0018669 A1 | 1/2003 | Kraft | |
| 2003/0102970 A1 | 6/2003 | Creel et al. | |
| 2003/0179908 A1 | 9/2003 | Mahoney et al. | |
| 2003/0191719 A1 | 10/2003 | Ginter et al. | |
| 2003/0214388 A1* | 11/2003 | Stuart et al. | 340/10.1 |
| 2004/0017313 A1 | 1/2004 | Menacho | |
| 2004/0041696 A1 | 3/2004 | Hull et al. | |
| 2004/0041707 A1 | 3/2004 | Hull et al. | |
| 2004/0044956 A1 | 3/2004 | Huang | |
| 2004/0078749 A1 | 4/2004 | Hull et al. | |
| 2004/0079796 A1 | 4/2004 | Hull et al. | |
| 2004/0181756 A1 | 9/2004 | Berringer et al. | |
| 2004/0205455 A1* | 10/2004 | Dathathraya | 715/500 |
| 2004/0257231 A1 | 12/2004 | Grunes et al. | |
| 2005/0035862 A1 | 2/2005 | Wildman et al. | |
| 2005/0105724 A1 | 5/2005 | Hull et al. | |

FOREIGN PATENT DOCUMENTS

| | | |
|---|---|---|
| JP | 08-101980 | 4/1996 |
| JP | 2002-522999 | 7/2002 |
| WO | WO 00/26856 A2 | 5/2000 |

OTHER PUBLICATIONS

Web pages from PaperClick.com printed from http://www.paperclip.com on Jun. 14, 2006.

\* cited by examiner

```
<workflow action>
<application user = "Jan Brady">
<Public_key> 653678 </Public_key>
<Requested_Action>
Enter patient identification and diagnosis code
</Requested_Action>
<Send_to>
Patient's employee benefit manager
</Send_to>
<Status> Awaiting completion </Status>
</workflow action>

<destination>
<company> Ricoh </company>
<application user = "Ronda Rich">
<public_key> 765890 </public_key>
<postal address>
223 Villa Boulevard, West Caldwell, NJ, 22356
</postal address>
<requested action>
Verify Eligibility and forward to Claims Processing
</requested action>
<Status> null </Status>
</destination>

<destination>
<company> Capon </company>
<application user = "Cathy Conroy">
<public_key> 006234 </public_key>
<postal address>
124 East Manchester, Palo Alto, CA 94025
</postal address>
<requested action>
Verify Eligibility and forward to Claims Processing
</requested action>
<Status> null </Status>
</destination>
```

*FIG. 8*

METHOD AND APPARATUS FOR TRACKING DOCUMENTS IN A WORKFLOW

CROSS-REFERENCES TO RELATED APPLICATIONS

This application is a continuation application of U.S. patent application Ser. No. 10/234,414, filed Sep. 3, 2002 now U.S. Pat. No. 6,860,422 and titled "Method and Apparatus for Tracking Documents in a Workflow," and is herein incorporated by reference for all purposes.

This application incorporates by reference the entire contents of the following applications for all purposes:

(1) U.S. patent application Ser. No. 10/235,035, filed Sep. 3, 2002;
(2) U.S. patent application Ser. No. 10/235,042, filed Sep. 3, 2002;
(3) U.S. patent application Ser. No. 10/235,032, filed Sep. 3, 2002;
(4) U.S. patent application Ser. No. 10/235,028, filed Sep. 3, 2002; and
(5) U.S. patent application Ser. No. 10/235,030, filed Sep. 3, 2002.

The present application incorporates by reference the entire disclosure of the following patent for all purposes:

(1) U.S. Pat. No. 5,978,477, issued Nov. 2, 1999 entitled "AUTOMATIC AND TRANSPARENT DOCUMENT ARCHIVING."

BACKGROUND OF THE INVENTION

The present invention relates generally to workflow systems and more particularly to tracking documents in a workflow system.

During the course of running a business, there are many steps and people involved in each endeavor. Accompanying this activity might be the flow of large numbers of documentation. For example, documents generated by a person or by people in a workgroup often require distribution to other people in the company or among different groups of people. Workflow systems provide a way for managing the flow of numerous documents during the course of a project.

Any substantial project is likely to produce volumes of paperwork. Effective management of a large-scale project requires up to date information. In the case of documents, it is important to know who has what document, how far along a document is in the review process, and so on. This can facilitate identifying critical paths and bottlenecks. It is therefore desirable to be able to enhance a workflow system to improve its utility.

SUMMARY OF THE INVENTION

A workflow system and method comprise one or more sensors disposed about an area of the workflow. The sensors detect proximity of a document as it is moved about in the area of the workflow. The information collected is associated with information relating to the document. The workflow system integrates this information with a display of the workflow graph, reflecting the movement of documents in the workflow. The workflow graph can be presented in graphical form, showing a graphical representation of the workflow.

BRIEF DESCRIPTION OF THE DRAWINGS

FIG. 8 illustrates a conventional XML representation of the workflow fragment shown in FIG. 7.

DESCRIPTION OF THE SPECIFIC EMBODIMENTS

Figure 1:
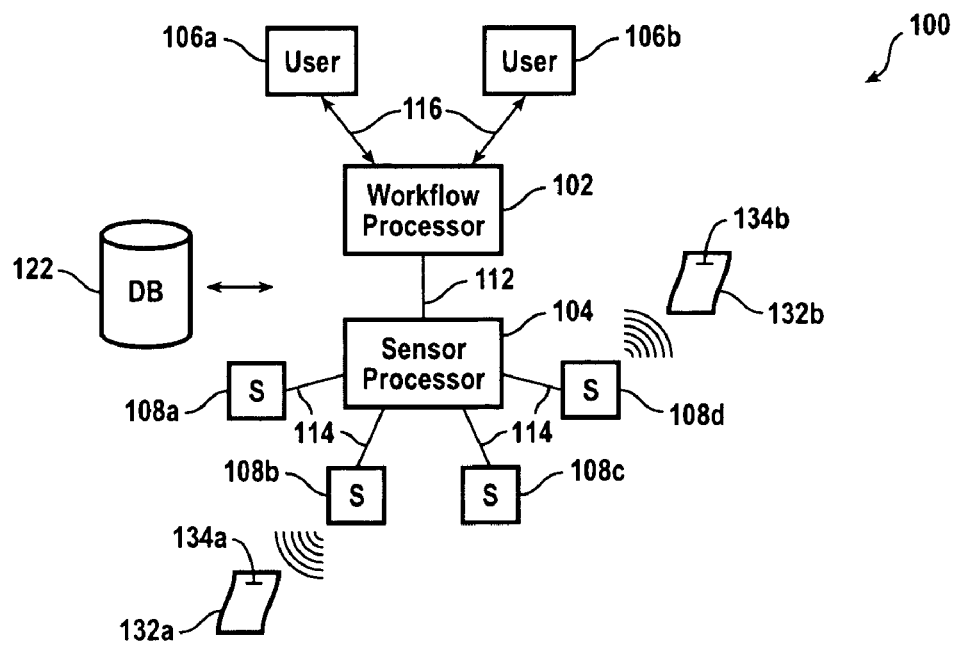
FIG. 1 is a simplified block diagram of a sensor arrangement for monitoring documents in accordance with an embodiment of the present invention.

FIG. 1 is a highly generalized block diagram of a document workflow system in accordance with an embodiment of the present invention. A workflow processor 102 represents the component that provides the functionality commonly found in typical workflow systems. Typically, this includes a computer component, such as a personal computer, running appropriate software. It can be appreciated that the workflow processor can be any appropriate computing configuration or platform. Some functions provided by a workflow system include identifying documents to be routed in the workflow. The workflow includes a workflow graph which identifies the paths along which the participating documents are to be routed.

Figure 2:
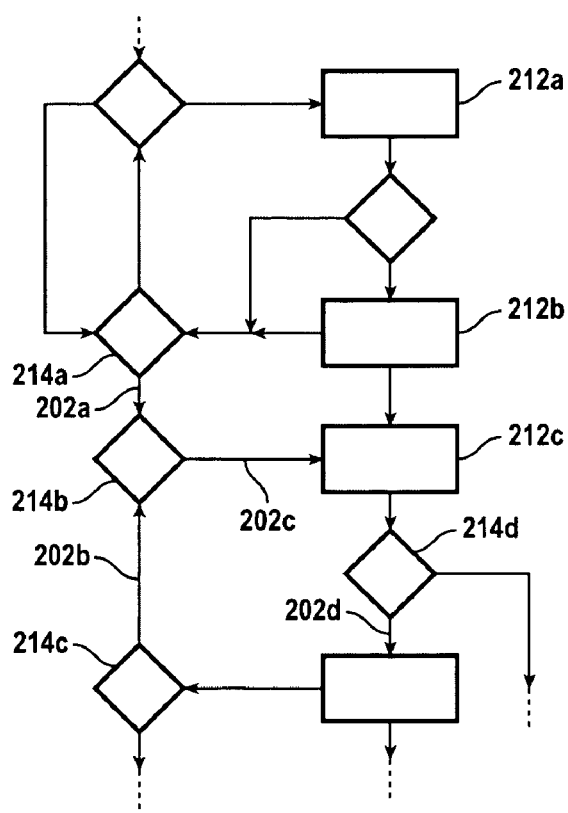
FIG. 2 illustrates an example of workflow.

Referring to FIG. 2 for a moment, a portion of a typical workflow is illustrated. This representation is an exemplar of a graphical representation of a workflow, used to illustrate aspects of embodiments of the present invention. It can be appreciated that actual workflow systems will include additional tools for the user.

A workflow comprises a plurality of stages (nodes of the graph) 212a-212c and 214a-214c, for example, at which an action is performed on the document(s). Each stage represents a location in the operation where the document can be routed; e.g. someone's office, or some other appropriate location for a particular given operation. The action may be a simple acknowledgment of having received the document, or the action may be something more interactive such as a review and/or editing or other annotation made to the document. The action may be a copy operation, a fax operation, or the like. There can be different kinds of stages. For example, stages 212a-212c are examples of simple store and forward stages where a document is received, an action might be performed on the document, and the document is then passed on. Stages 214a-214c, for example, are branching stages where the document flow can proceed along alternate paths. The workflow is further defined by edges 202a-202d, for example, which connect the stages together to complete the flow graph.

In the particular example shown in FIG. 2, a graphical representation of a workflow is illustrated. It can be appreciated, however, that other representational forms are possible. For example, it may be more appropriate under certain situations to represent a workflow in a textual format. A machine interface may use a representational form more suitable for communication among computing equipment.

Returning to FIG. 1, the workflow processor 102 may be provided with appropriate user interfaces 106a, 106b. As noted above, the user interface can be a graphical user interface (GUI) presented on a suitable display device and having appropriate input devices (e.g., keyboard, voice input, mouse, and other commonly used input devices) to facilitate creating and editing workflows. While a GUI is an appropriate interface, a textual interface can also be used. Each user interface is in communication with the workflow processor via an appropriate communication channel 116, such as a network-type of connection, a direct connection to the processor, a modem connection, and so on.

The workflow system shown in FIG. 1 further includes a sensor processing component 104. This component can comprise a single computer device, or other appropriate configuration. Sensors 108a-108d are disposed about the plurality of locations which can be included in a workflow. In one particular implementation of an embodiment of the invention, the location of each sensor is known to the sensor processing component. In another particular implementation, each sensor can provide information about its location to the sensor processing component. Each sensor can communicate information to the sensor processing component over a channel 114.

It can be appreciated that in a large enterprise, the sensors might very well be distributed over a large geographic area. In such a case, the sensor processing component 104 might comprise a network of local computers where each local computer handles sensors local to that computer. For example, a set of sensors in an office in Paris might be linked to a local computer in that office, while a second local computer might be used to link together the sensors in an office in Tokyo. In such cases, it is understood that an element (e.g., sensor 108c shown in FIG. 1) can be viewed as a logical, recursively defined, representation of a local sensor group, comprising a plurality of local sensors and a local computer communicating. The local computer communicates sensor data from its local sensors to the sensor processor 104.

In accordance with this embodiment of the invention, each sensor $108_i$ is sensitive to proximity of one or more documents being routed in a workflow. In a particular implementation of this embodiment of the invention, a radio frequency identification (RFID) system constitutes the sensor subsystem. RFID is a versatile wireless solution for identification. It has a wide range of applications, from tracking books in a library to monitoring the movement of cattle on a ranch.

Figure 3A:
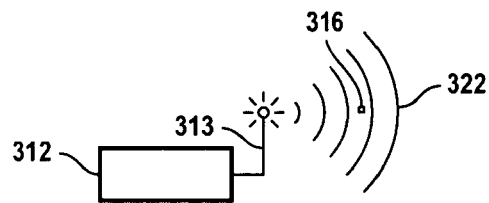
FIGS. 3A and 3B show a radio identification system as used in an implementation of an embodiment of the present invention.
Figure 3B:
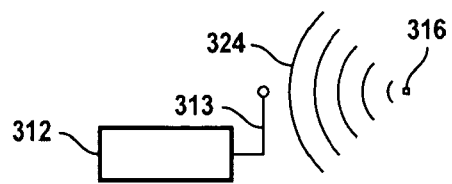

Referring for a moment to FIGS. 3A and 3B, a basic RFID system comprises three components: an antenna component (coil) 313, a transceiver component 312, and a transponder (commonly called an RFID tag) 316. The antenna component 313 emits radio signals to activate the tag 316. Antennas are available in a variety of shapes and sizes.

Often, the antenna component 313 is packaged with a transceiver component 312 which typically includes a decoder module. This combination is referred to variously as a reader, an interrogator, and soon. In operation, the reader can emit radio waves 322 (interrogation signal) in ranges of anywhere from one inch to several feet or more, depending upon its power output and the radio frequency used. The transceiver component produces the interrogation signal which is then propagated by the antenna component.

When an RFID tag passes through the electromagnetic zone of the interrogation signal, it responds to that signal and produces a response signal 316 which is picked up by the antenna component 313 and fed to the transceiver component 312. The decoder module in the transceiver decodes the response signal to extract the data encoded in the tag and the data is passed to a host computer for subsequent processing.

RFID tags come in a wide variety of shapes and sizes. Some tags can only be read, while other tags can be read and written. For example, a product called the MU-chip by Hitachi, Ltd., is a 0.4 $mm^2$ chip that is thin enough (about 60 µm) to be embedded in paper, and contains a read-only memory (ROM) of 128 bits.

RFID tags are categorized as either active or passive. Active RFID tags are powered by an internal battery and are typically read/write, i.e., tag data can be rewritten and/or modified. The battery-supplied power of an active tag generally gives it a longer read range. The trade off of course is greater size, greater cost, and a limited operational life due to the limited life of the battery. Nonetheless, it can be appreciated that active tags can be useful in the present invention under appropriate operational requirements.

Passive RFID tags operate without a separate external power source and obtain operating power generated from the interrogation signal transmitted from the reader. Passive tags are consequently much lighter than active tags, less expensive, and offer a virtually unlimited operational lifetime. The trade off is that they have shorter read ranges than active tags and require a higher-powered reader. Read-only tags are typically passive and are programmed with a unique set of data (usually 32 to 128 bits) that cannot be modified. For example, the Hitachi MU-chip comes preprogrammed with a 128 bit data word.

In accordance with the present invention, physical documents have one or more RFID tags physically associated with them. Such documents can be referred to as "tagged documents." A plethora of attachment processes are possible. An RFID tag can be attached by the use of adhesives. A clip which gathers together a multi-page document can be provided with an RFID tag. For example, a paper clip may-incorporate a tag, or a staple can be incorporated with a tag.

The attachment can be manual, or by automation. For example, a copying machine can be outfitted with RFID tagged staples or a dispenser of adhesive tags, so that stapled copies can be tagged by way of the staple, or single-page copies can be tagged with an adhesive tag. RFID tags (e.g., Hitachi MU-chip) can be embedded in the paper medium itself ("tagged paper").

In accordance with this particular implementation of an embodiment of the invention, each RFID tag is associated with a unique identification, referred to herein as a "tag identifier." Furthermore, when a tag is physically associated with a physical document, there is an association between the tag identifier and "document information" relating to the physical document. The document information might comprise an electronic copy of the physical document, an image of the document, a reference which identifies the physical or an electronic form of document, a reference identifying where an electronic copy of the physical document can be found, references to other documents, and so on. The document information might include information indicative of permissions, for example, whether a document can be copied or not. The document information might include ownership information, document modification history information. In general, one can appreciate that any kind of information may constitute "document information."

The document information can be collected at the time of creation of the document; e.g., when the document is printed, copied, faxed, or otherwise processed. The document information can be an accumulation of information collected during the lifetime of the document such as when modifications are made, or when copies are made, for example. A database system (not shown) can be provided to store such information, or other suitable information management system. The database or information management system can be used to provide the mapping between tag identifier and document information.

Returning to FIG. 1, it can be appreciated from FIGS. 3A and 3B that the plurality of sensors 108a-108d can comprise the transceiver and antenna component of an RFID system. Each sensor $108_i$ includes a transceiver circuit and an antenna for transmitting an interrogation signal and for receiving a response signal from a document 132a. Each sensor further includes a communication component for communicating information received from the tag 134a embedded in a sensed document (i.e., the tag identifier) to the sensor processing component 104. The sensor processor then associates the tag identifier with the particular sensor that transmitted the information. In an implementation of an embodiment of the invention, the location of each sensor is known a priori. Consequently, the sensor processor can make the further association of tag identifier with location of the tag and its associated physical document. Finally, the database system can provide to the sensor processor a mapping of the tag identifier with an identity of the sensed document. Thus, it can be seen that the location of a document is known, insofar as the sensors can detect the document.

The workflow processing component 102 is in data communication with the sensor processing component 104 via communication channel 112. Communication between the workflow processor and the sensor processor can be provided by any of a number of known communication techniques. In one embodiment of the invention, the two processing components could be subsystems in the same computer system. On the other hand, in a large enterprise where a distributed architecture may be more appropriate, the sensor processing component may comprise a plurality of local computer systems, each receiving tag information from its associated RFID tags.

The sensor processing component 104 transmits to the workflow processor 102 information indicative of the sensed (detected) document(s) and information representative of the location where the document(s) were sensed. Alternatively, the sensor processing component might transmit to the workflow processor the tag identifier along with information indicative of the sensor $108_i$ that received the information. The workflow processor can then make the necessary mappings to obtain a document identifier and its physical location. In a distributed environment comprising plural sensor processing computers, some of the sensor processors may provide the mapped information to the workflow processor, while other sensor processors might transmit the "raw" data to the workflow processor.

Figure 2A:
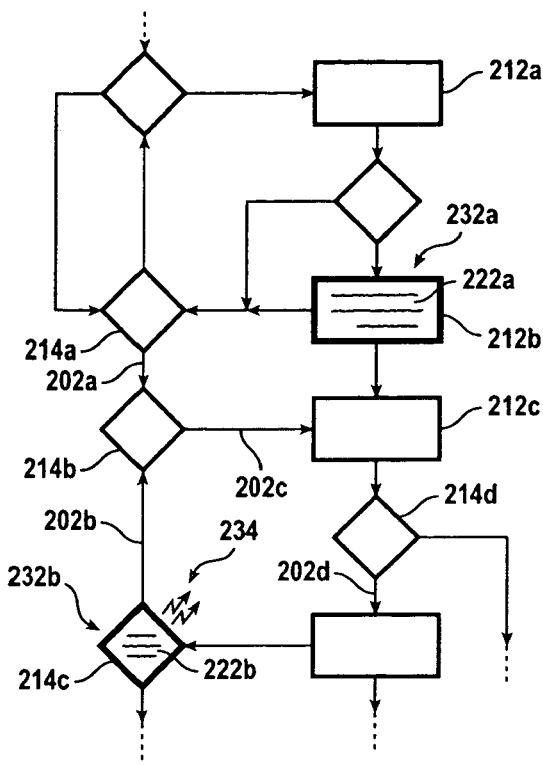
FIGS. 2A and 2B show enhancements to a conventional workflow according to the present invention.

Assuming the workflow processor 102 is in possession of information relating to a document and information indicative of its location, the information can be used to enhance the workflow graph. Referring to FIG. 2A, the workflow segment illustrated in FIG. 2 is shown as it might appear in a GUI. The figure illustrates a tracking feature of document flow wherein the physical location of a document can be tracked without information provided by a user, sometimes referred to as "unconscious" tracking, automated tracking, and so on. Upon receiving an appropriate display command from the user, the workflow graph presented to the user (on a display, for example, as shown in FIG. 2) can be enhanced with information-from the sensors $108_i$ received from the sensor processing component 104.

As an example, in FIG. 2A the current location 232a of a document is indicated by highlighting (or some otherwise visually indicating) the node (stage, 212b) in the workflow which corresponds to that current location. It can be appreciated, of course, that other indicating techniques can be used. Additional information 222a can be presented as well. For example, information indicating an action taken on the document might be displayed, if available. The additional information can be another document(s) that has become associated with the document; for example, a reviewer of the document might attach, or otherwise associate, a related document to the document in the workflow.

FIG. 2A further illustrates that a document can be routed electronically. Thus, for example, stage 214c is the current location 232b of a second document. Here, the document is in electronic form. This can be indicated by a suitable graphic such as the "lighting bolts" 234 intended to illustrate that the second document exists in electronic form.

Figure 2B:
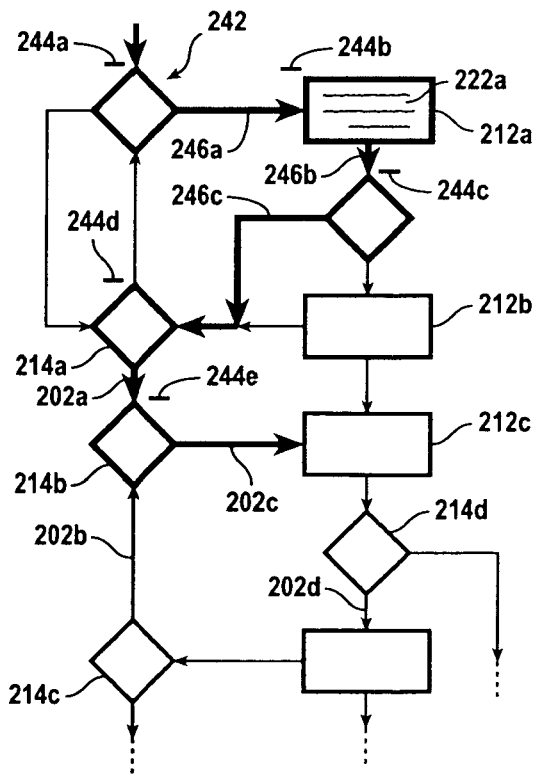

FIG. 2B illustrates another feature of the workflow system of the present invention. The tracking information collected by the sensor processing component 104 can be used to compile a tracking history of a document in the workflow. The figure shows an example of such a display. A tracking history 242 comprises highlighted portions of the workflow indicating the stages and edges which constitute movement of the document in the workflow. Thus, for example, the edges 246a-246c and others are indicated by highlighting, or some equivalent visual indication. The stages where the document was sensed are also shown highlighted. Collectively, the highlighted portions pictorially show the flow of the document. It might be useful to have additional information 244a-244e associated with each stage in the tracking history. For example, a time stamp indicating the time of detection at each stage can be stored and displayed. Other additional information 222a can be associated with each stage as discussed above; e.g., action taken on a document, related documents can be associated with the document being tracked, and so on.

Figure 4:
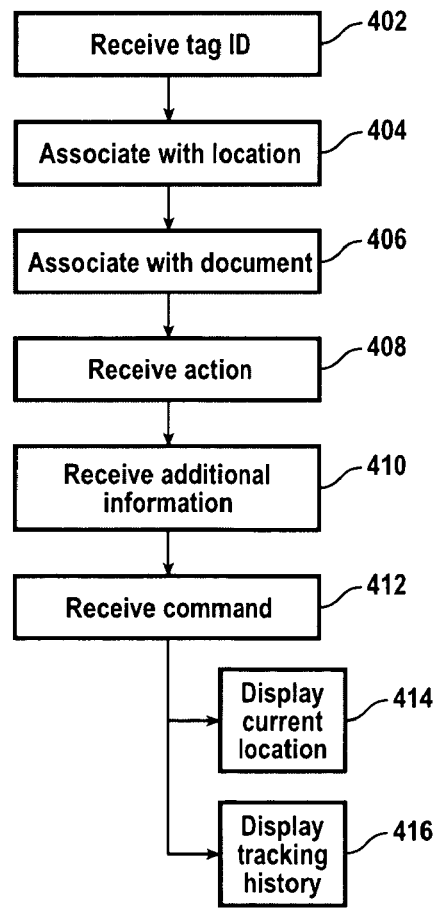
FIG. 4 illustrates high level processing according to the invention.

FIG. 4 is a high-level flow chart illustrating processing steps of a workflow system according to the foregoing aspects of the present invention. At a step 402, a sensor $108_i$ detects the proximity of a document 132a. This includes receiving a response signal from the tag 134a that is physically associated with the document in response to an interrogation signal. The response signal includes information indicative of a tag identifier associated with the tag. At a step 404, the sensed tag information is associated with information indicative of the location of the sensor which detected the response signal. As discussed above, locations of sensors can be known a priori by the sensor processing component 104. Alternatively, a sensor can be appropriately configured to communicate some information along with the tag identifier that indicates an identity of the sensor itself. A mapping of the sensor identity can be made to determine its location. In yet another alternative, an indication of the location of the sensor can be communicated to the sensor processing component. A time stamp can be associated with the tag identifier to indicate when the document was detected and the location of the detection.

At a step 406, the tag identifier is associated with the document. This can be accomplished using information contained in a database 122, for example containing a mapping between tag identifiers and document identifiers.

Certain actions can be taken on the document at steps 408 and 410. For example, the recipient may simply acknowledge receipt of the document. The user may annotate or otherwise modify the document; e.g., by associating other documents with it, and so on. The user interface 106$_i$ can provide the necessary access and functionality to effect such actions. These actions can then be associated with the tag identifier by the workflow processing component 102.

The user can enter a display command at a step 412 to display all or a portion of the workflow. The user might submit a command to display the current location of a particular document or documents. At a step 414, the association among the information made in the foregoing steps can be used to identify the location(s) of the document(s). The workflow can then be displayed where those stage(s) corresponding to the identified location(s) are highlighted in an appropriate manner to show their current locations. If tracking history is desired, then in a step 416 the workflow graph can be displayed in a manner to highlight the flow of the document in the workflow graph.

Figure 5:
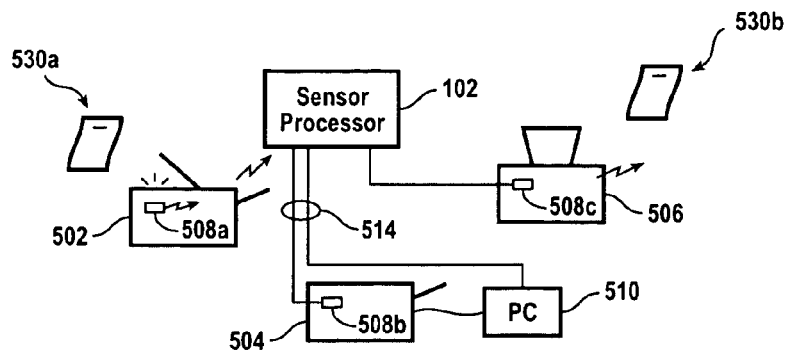
FIG. 5 show various sensor configurations for detecting actions that can be performed on a document.

FIG. 5 shows some additional sensors which can be incorporated in various document processing devices. A copying machine 502 can be equipped with a sensor 508a. Thus, if a copy of a tagged document 530a is made, the sensor can detect the presence of the tagged document and indicate to the sensor processing component 104, the action of a copy having been made. This action is then associated with the tag identifier.

Similarly, a printer 504 having a sensor 508b can detect printing of material. Stock paper, having physically associated with it one or more tags, can be detected by the sensor when processing a print job sent by a PC 510. A communication link 514 from the printer and the PC can provide to the sensor processing component 104 information indicating the tag identifier and the document being printed. This establishes the existence of the printed document, and subsequent tracking of the document in the workflow. In addition, the action of the printing of the document can be associated with the document, and subsequently displayed to a user in the manner discussed above (see, e.g., FIGS. 2A and 2B).

The element 504 can also represent a scanner device having a sensor 508b. When a tagged document is scanned, the sensor can detect the tag of the scanned document and communicate the tag identifier to the sensor processing component 104. The scanned data is stored in the PC as a document. A document identifier can be communicated to the sensor processing component to be associated with the tag identifier. In this way, a tagged document in the workflow can be converted to electronic form. This action of scanning can be captured and associated with the document.

FIG. 5 shows a facsimile transmission (fax) device 506. This device is also equipped with a sensor 508c. When a tagged document in the workflow is faxed to a recipient via the fax device, the sensor obtains the tag identifier and communicates that information to the sensor processing component 104. There, the tag identifier is associated with the document identifier, as well as the action of being faxed. In addition, the fax device can communicate the fax number of the receiving machine to the sensor processing component.

Figure 6:
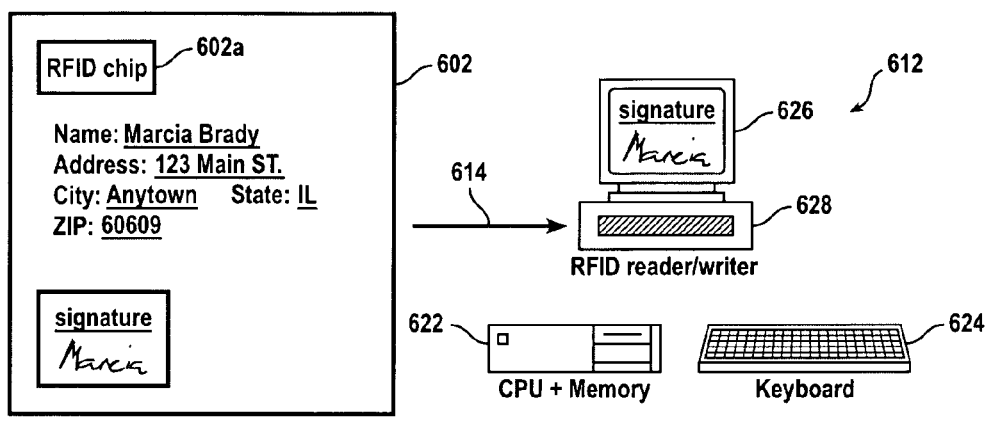
FIG. 6 illustrates an example of a workflow appliance in accordance with the present invention.

FIG. 6 shows an implementation of an embodiment according to another aspect of the invention, incorporating the use of re-writable RFID chips. When the RFID chips embedded in documents are re-writable, an "autonomous" workflow functionality can be provided for users not connected to an online workflow processor 102. This can be done by describing the workflow that contains the given document 602 and the position of the document in that workflow in a standard way. Such a description language would provide a means to specify the actions that have been performed on that document and the actions that can be performed on it in the future.

Users would scan a re-writable RFID chip 602a contained in the document 602 using a suitable device 612 (more abstractly referred to as a workflow appliance). The workflow appliance can include a CPU (central processing unit) or other similar data processing component 622, a memory component 624, a display 626, and a device 628 for reading and-writing the RFID chip 602a and to provide user services such as logging in and so on. The workflow description 614 can be downloaded from the RFID chip to the workflow appliance which displays the workflow diagram. The display can indicate where the document is in that diagram and what actions the user could take on that document. After the user takes one of those actions, it is recorded on the chip and the diagram is updated and rewritten on the chip. That data can optionally be encrypted with the next receiver's public key. When that user opens the document, he can decrypt it with his private key.

If the workflow description language is in a standard format, users of an autonomous workflow system can easily process documents produced by different service providers. For example, Blue Cross might use an Oracle Workflow system for their medical claim forms and Cigna might use an IBM system. However, the workflow appliance in a Doctor's office does not need to know that. The information added to the form, such as the name, address, and diagnosis code for the patient, can be recorded on the chip using the standard format.

A further aspect of the various embodiments of the present invention include information recorded on the re-writable RFID tag 602a to direct the user to take certain actions. This provides a certain level of autonomous behavior in the document, where the document can require the recipient of the document to take actions in a context-directed manner. Information can be written to the RFID tag 602a along the way in the workflow at its various stops by a backend workflow server. The information in the RFID can be updated at each stop, or only at certain stops, depending on the situation. In an extreme case, the RFID can contain the entire workflow in which case the document is in essence a fully autonomous document, instructing it's recipients (via an appropriately configured workflow appliance) where the next stop is, or what the next action is.

Figure 7:
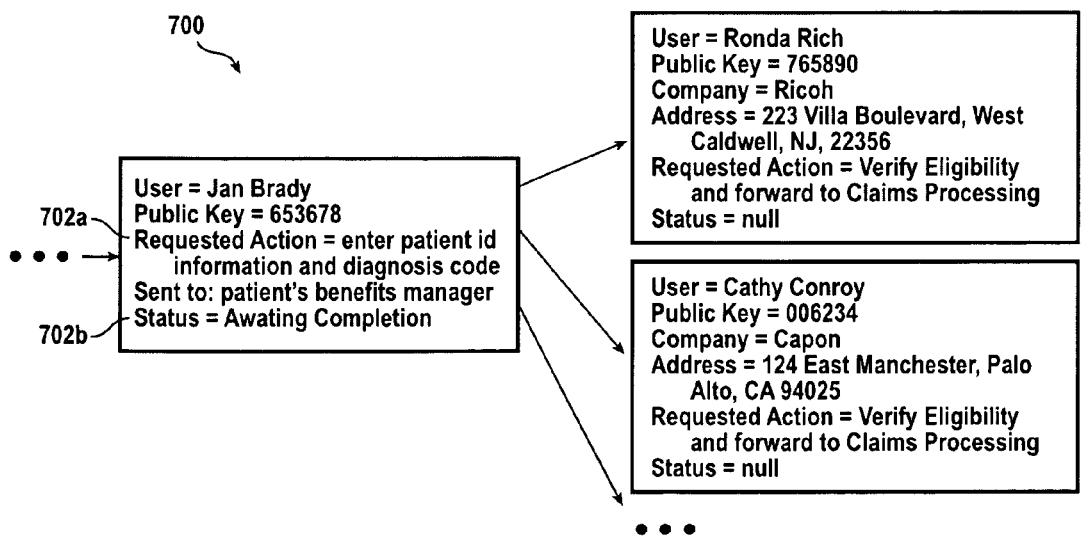
FIG. 7 illustrates an example of a partial workflow diagram of a forms processing system.

For example, the fragment of a workflow diagram 700 depicted in FIG. 7 shows an action 702a being requested of a user Jan Brady. She has been asked to enter the identification information for the patient, the diagnosis code, and to send the form to the employer's account manager. The routing information for the possible receivers (the account managers) is provided so Jan knows where to send the paper form after it has been filled out. This diagram fragment can be represented in a text-based format (e.g., XML) as shown in FIG. 8. Before the form is filled out, the status 702b is "awaiting completion." After the form has been filled out, the status is changed to "in transit" as it is being sent to the intended receiver. Since the hypothetical patient works for the Ricoh company, the paper form was sent to Ronda Rice at 223 Villa Boulevard, West Caldwell, N.J. since she's the benefits manager for that company. It can be appreciated that this aspect of the invention allows for disparate workflow systems to co-operate, despite the differences in workflow procedure and policy that are likely to exist among the different systems. The amount of information contained in the RFID tag, of course, will depend on the storage capacity of the device. Additional devices may be incorporated. It can be appreciated that system requirements, functional requirements, performance requirements, and other such factors will determine specific implementation details.

An external workflow system can be informed of this updated workflow diagram either online, or asynchronously (e.g., via an email message), or not at all. Since the updated diagram is carried in the chip 602a, a network connection is not required when the document's information is updated. This can be a significant advantage since the physical location where the update occurs does not need to be equipped with a network connection. In fact, a simple workflow status-updating appliance is sufficient.

The workflow appliance reads the standard workflow description from the chip, determines the actions that are possible, displays those actions to the user, provides a means for the user to enter the result of such an action, and rewrites the memory of the chip to indicate the action that was performed. For example, the workflow appliance 612 shown in FIG. 6 can be suitably configured with appropriate software to process documents in a financial institution's workflow. The user is being asked to verify the validity of the signature on the form by comparing it to information in the account record. The result of this action, as well as the time, date, and place where it was performed, are recorded on the chip. By reading and writing a standard workflow description language, the appliance can process documents that are represented in a workflow system provided by any vendor that supports such a standard interface language. Standard workflow interface descriptions that provide interoperability between workflow systems are under development by industry groups such as the Workflow Management Coalition (see, for example, the web site at "http:\\www.wfinc.org").

What is claimed is:

1. A copying device to be used in conjunction with a document workflow system, the copying device comprising a sensor, the sensor operable to transmit an interrogation signal to an identification component that is physically associated to a document and operable to receive from the identification component a response signal transmitted from the identification component in response to the identification component receiving the interrogation signal,
   wherein the copying device is configured to communicate to a processing component of the document workflow system information indicating that a copy of the document has been made, wherein the document workflow system is configured to display the information as part of a workflow graph, and wherein the workflow graph includes a tracking history, the tracking history providing a visual indication of the movement of the document through the workflow graph.

2. The copying device of claim 1, wherein the document workflow system is configured to display the information as part of a workflow graph in a graphical representation of the workflow.

3. The copying device of claim 1, wherein the document workflow system is configured to display the information as part of a workflow graph in a textual format.

4. The copying device of claim 1, wherein the document workflow system is configured to display the information as part of a workflow graph in a representational form suitable for communication among computing equipment.

5. The copying device of claim 1, wherein the sensor is configured to provide information about the sensor's location.

6. The copying device of claim 1, wherein the document workflow system is configured to enhance the display of the workflow graph based upon information received from the sensor.

7. The copying device of claim 1, wherein the document workflow system is configured to enhance the display of the workflow graph based upon location information of the document, the location information received from the sensor.

8. The copying device of claim 1, wherein the document workflow system is configured to enhance the display of the workflow graph based upon an action taken on the document.

9. The copying device of claim 1, wherein the document workflow system is configured to enhance the display of the workflow graph to indicate that the document exists in electronic form.

10. The copying device of claim 1, wherein the sensor is configured to communicate information that indicates an identity of the sensor.

11. A printing device to be used in conjunction with a document workflow system, the printing device comprising a sensor, the sensor operable to transmit an interrogation signal to an identification component that is physically associated to one or more sheets of paper and operable to receive from the identification component a response signal transmitted from the identification component in response to the identification component receiving the interrogation signal,
   wherein the printing device is configured to communicate to a processing component of the document workflow system information indicating that a document has been printed on the one or more sheets of paper, wherein the document workflow system is configured to display the information as part of a workflow graph, and wherein the workflow graph includes a tracking history, the tracking history providing a visual indication of the movement of the document through the workflow graph.

12. The printing device of claim 11, wherein the printing device is configured to receive stock paper having one or more tags physically associated with the paper, further wherein the sensor is configured to detect the paper when a print job is processed by the printing device.

13. A scanning device to be used in conjunction with a document workflow system, the scanning device comprising a sensor, the sensor operable to transmit an interrogation signal to an identification component that is physically associated to a document and operable to receive from the identification component a response signal transmitted from the identification component in response to the identification component receiving the interrogation signal,
   wherein the scanning device is configured to communicate to a processing component of the document workflow system information indicating that the document has been scanned, wherein the document workflow system is configured to display the information as part of a workflow graph, and wherein the workflow graph includes a tracking history, the tracking history providing a visual indication of the movement of the document through the workflow graph.

* * * * *